US006668272B1

(12) United States Patent
Keller et al.

(10) Patent No.: US 6,668,272 B1
(45) Date of Patent: Dec. 23, 2003

(54) INTERNET-BASED PROCESS OPTIMIZATION SYSTEM AND METHOD

(75) Inventors: Jeffrey S. Keller, Cincinnati, OH (US); Gary L. Hundley, Jr., Hamilton, OH (US); Patricia A. Charles, Hamilton, OH (US); Richard M. Gillespie, Florence, KY (US); Carl G. Fryman, Covington, KY (US); Christopher R. Hammond, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/546,514

(22) Filed: Apr. 11, 2000

Related U.S. Application Data

(60) Provisional application No. 60/163,811, filed on Nov. 5, 1999.

(51) Int. Cl.⁷ .............................................. G06F 15/16
(52) U.S. Cl. ...................................... 709/203; 709/217
(58) Field of Search ................................ 709/203, 202, 709/217, 218, 219; 707/2

(56) References Cited

U.S. PATENT DOCUMENTS

| | | | | |
|---|---|---|---|---|
| 5,930,786 A | * | 7/1999 | Carino et al. | 707/4 |
| 5,963,939 A | * | 10/1999 | McCann et al. | 707/4 |
| 6,456,308 B1 | * | 9/2002 | Agranat et al. | 345/854 |
| 6,466,928 B1 | * | 10/2002 | Blasko et al. | 706/46 |

* cited by examiner

Primary Examiner—Mehmet B. Geckil
(74) Attorney, Agent, or Firm—William Scott Andes; Pierce Atwood

(57) ABSTRACT

A process optimization system and method uses a computer network, particularly the Internet, to standardize a process performed at a number of geographically separated locations while assuring optimal use of available process technology. The system includes at least one central server computer system and at least one client-user computer station at each location. Data relating to the process is inputted into the server computer system using any one of the client-user computer stations. The server computer system the uses the data to determine an optimal approach to the process and displays the optimal approach on the client-user computer station used to input the data.

8 Claims, 5 Drawing Sheets

| Part Number | Previous Repair Source | Customer | Shop Order Number | Engine Serial Number | Number of Items Received | Date |
|---|---|---|---|---|---|---|
| 1475M35P01 ▼ | First Repair ▼ | ComAir ▼ | | | 72 | 10/01/99 |
| Is there evidence of Leading Edge Burning? | | | | | Yes ☐ No ☐ | |
| Has blade been Repaired Previously? | | | | | Yes ☐ No ☐ | |
| If previously repaired −Estimate individual Weld Prep required | | | | >.575" ☐ | .426−.575" ☐ | <.425" ☐ |
| If previously repaired −Estimate Cumulative Weld Preps required | | | | >.775" ☐ | .575−.775" ☐ | <.575" ☐ |
| Does the blade exceed Limits for Leading Edge Nose Hole Cracks? | | | | | Yes ☐ No ☐ | |
| Does the blade exceed Limits for Leading Edge Foreign Object Damage? | | | | | Yes ☐ No ☐ | |
| Does the blade exceed Limits for Trailing Edge Foreign Object Damage? | | | | | Yes ☐ No ☐ | |
| Does the blade exceed Limits for Airfoil Surface Foreign Object Damage? | | | | | Yes ☐ No ☐ | |
| Does the blade exceed Limits for Cracking in the Tip Cap? | | | | | Yes ☐ No ☐ | |
| Are there any Cracks in Airfoil to the Parent Material? | | | | | Yes ☐ No ☐ | |
| Is there any Craze Cracking in the Airfoil Coating? | | | | | Yes ☐ No ☐ | |
| Does the blade exceed Limits for Parent Material Corrosion? | | | | | Yes ☐ No ☐ | |
| Does the blade exceed Limits for Airfoil Coating Corrosion Lines? | | | | | Yes ☐ No ☐ | |
| Does the blade exceed Limits for Open Blisters in Airfoil Coating? | | | | | Yes ☐ No ☐ | |
| Does the blade exceed Limits for Missing Coating and Chipping? | | | | | Yes ☐ No ☐ | |
| Inspect Blade | Next Blade | Save | Reset | | Blade 0 of 72 | |
| Inspection Results: | | | Reports | | | |
| Tip | Full−PtAl | Full−Al | Scrap | Salvation | Rejuvenation | |
| 0 | 0 | 0 | 0 | 0 | 0 | |

FIG. 2

INTERNET-BASED PROCESS OPTIMIZATION SYSTEM AND METHOD

CROSS REFERENCE TO RELATED APPLICATION

This application claims the benefit of U.S. Provisional Application No. 60/163,811, filed Nov. 5, 1999.

BACKGROUND OF THE INVENTION

This invention relates generally to repair and manufacturing processes and more particularly to a system and method of using the Internet to optimize such processes.

In today's global economy, many businesses operate with numerous facilities located around the world. Quite often, similar processes, such as manufacturing and repair processes, are performed at the business's various facilities. Many of these operations are technically complex, and the end result is that process variation exists between the facilities and sub-optimal use of available manufacturing and repair technology occurs.

One exemplary industry where this can happen is aircraft engine repair. During operation of a gas turbine aircraft engine, many components of the engine are exposed to a high temperature, corrosive gas stream that limits the effective service life of these components. These components can become cracked, corroded, and otherwise damaged such that they must be either repaired or replaced to maintain safe, efficient engine operation. Because they are relatively expensive, it is generally more desirable to repair such components whenever possible. Typically, aircraft operators such as airlines periodically send engine components to a repair shop for maintenance. It is not uncommon for an engine service business to have repair facilities located throughout the world. In this case, it is desirable for the business to be able provide its customers with the same level of high quality service at each facility. However, as mentioned above, it is possible that process variation can develop between the various facilities given their distant locations. Such process variations can be combatted through written communications, such as manuals, and cross-site employee training. However, it is difficult to promptly produce updated manuals and to assure that each facility is using the most recent version. Employee training efforts are time consuming and costly, particularly when dealing with groups of employees located throughout the world.

Accordingly, there is a need for a way to easily and quickly obtain standardized processes across all locations while assuring optimal use of available manufacturing and repair technology.

BRIEF SUMMARY OF THE INVENTION

The above-mentioned need is met by the present invention which provides a process optimization system and method of using a computer network, particularly the Internet, to standardize a process performed at a number of geographically separated locations while assuring optimal use of available process technology. The system includes at least one central server computer system and at least one client-user computer station at each location. Data relating to the process is inputted into the server computer system using any one of the client-user computer stations. The server computer system then uses the data to determine an optimal approach to the process and displays the optimal approach on the client-user computer station used to input the data.

The present invention and its advantages over the prior art will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

FIG. 2 graphically illustrates a user interface screen of the present invention.

DETAILED DESCRIPTION OF THE INVENTION

Figure 1:
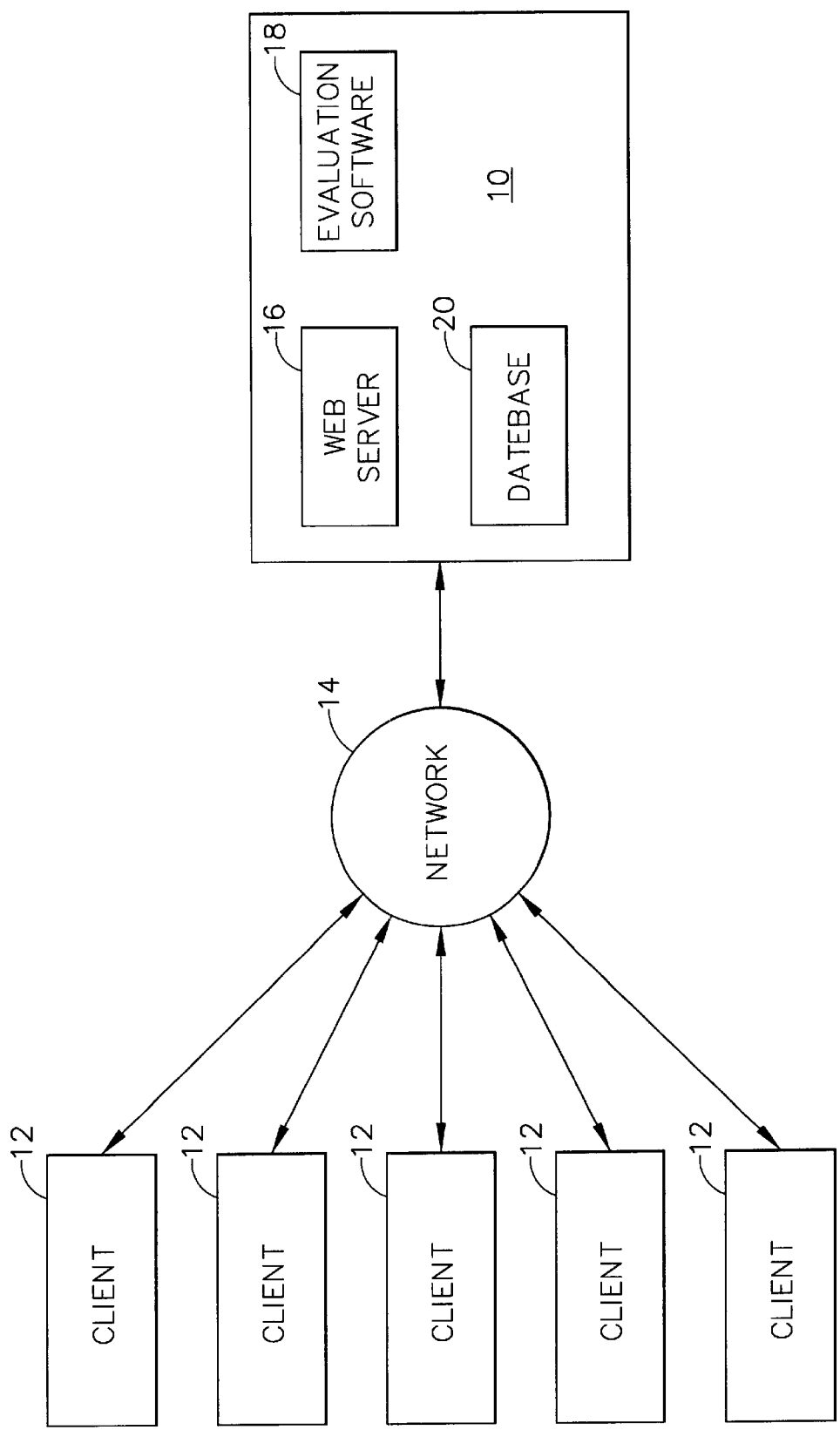
FIG. 1 is a schematic view of the process optimization system of the present invention.

Referring to the drawings wherein identical reference numerals denote the same elements throughout the various views, FIG. 1 shows the components of the process optimization system of the present invention. These components include at least one central server computer system 10 and a plurality of client-user computer stations 12 that can be geographically dispersed on a regional, national or worldwide basis. The server computer system 10 and client-user computer stations 12 are all connected via a computer network 14. As described herein, the network 14 is the Internet, although it possible to employ other types of computer networks such as a local area network or a wide area network. In general, the client-user computer stations 12 include a conventional Web browser software application that allows the computer station to access Hypertext Markup Language (HTML) Web pages and other data stored on the server computer system 10 or any other server systems connected to the network 14. Note that the present invention is not limited to the use of HTML; other suitable languages may be substituted within the scope of the present invention.

The server computer system 10 includes a Web server 16 (i.e., a computer program that serves requested HTML pages or files), a process selection software application 18 for determining an optimal process approach based on user input, and a database 20. Generally, a user responsible for performing a particular process, such as a repair or manufacturing process, uses the client-user computer station 12 to input data relating to the given set of circumstances that he or she is faced with. The selection software 18 uses this data input to determine the best approach to the process under the given set of circumstances. Thus, the process is optimized and standardized across all users throughout the world.

When a remote user wishes to access the process optimization system, he or she utilizes a client-user computer station 12 to access the server computer system 10. Specifically, the client-user computer station's Web browser sends a request to the Web server 16. In response, the Web server 16 sends the appropriate Web page file to the client-user computer station 12. As shown in FIG. 2, the file generates primary user interface screen 22 that is displayed on the client-user computer station's monitor.

The primary user interface screen 22 is a graphical user interface that guides the user through the steps of the optimization process as will now be described. The following description will involve an exemplary process of inspecting a batch of high pressure turbine blades for repair. Typically, a customer (an aircraft operator such as an airline) will send a batch of high pressure turbine blades to a repair shop for periodic maintenance. The repair shop initially inspects the blades individually to determine which blades are to be scrapped (i.e., are beyond repair) and which blades can be repaired. Various types of blade repair techniques are known. For instance, depending on its level of damage and history of prior repairs, a blade could be subjected to full repair, full repair using platinum aluminide, tip repair, rejuvenation repair and so on.

Because of the regional or global nature of aircraft operations, it is not uncommon for a repair enterprise to have repair facilities located throughout the world. The process optimization system of the present invention is used in such an instance to assure that repair techniques are employed consistently at all repair facilities. Each repair facility would have one or more client-user computer stations 12 for accessing the server computer system 10. A user inputs data relevant to the repair of the blades, and in response the selection software 18 makes a determination of what the optimal repair is. This is referred to herein as the repair selection determination. It should be noted that such a blade inspection and repair operation is used herein only as an example to facilitate disclosure of the present invention. The present invention is not limited to such an operation and is applicable to a wide variety of repair and manufacturing operations.

The primary user interface screen 22 has four primary sections: a data input section 24, an user prompt section 26, a functional buttons section 28, and a results display section 30. The input section 24 includes a number of input windows that allow the user to input data about the batch of blades that have been received for repair. Some of the data that the user fills these information fields with will be used by the selection software 18 in making the repair selection determination. Other data will be used to correlate data being entered into the database 20.

For instance, the user enters the part number in the first input window 32. The part number identifies the specific type of blade, thereby assisting the selection software 18 in determining an appropriate repair because some repairs are not an option for certain types of blades. Preferably, the first input window 32 includes a pull-down menu that provides a complete list of part numbers to choose from. If the blade has been previously repaired, the user enters information regarding the type of repair made and the source of the repair in the second input window 34. The identity of the customer is entered in the third input window 36. The second and third input windows 34 and 36 may also be provided with pull-down menus. The shop order number is entered in the fourth input window 38, and the engine serial number is entered in the fifth input window 40. The total number of blades in the batch is entered in the sixth input window 42. Lastly, the date is entered in the seventh input window 44. It should be understood that the data input section 24 could be configured to receive other types of data. Each of the input windows is labeled with a description of the type of data received to facilitate the user in entering the proper data therein.

The user prompt section 26 includes a series of questions that guide the user through the blade inspection process. As the user progresses through the questions, he or she makes selections that are ultimately used by the selection software 18 in making the repair selection determination. The questions are composed to elicit from the user all the information that is needed in making the determination. The questions are answered by clicking on the appropriate radio buttons located on the primary user interface screen 22 adjacent to each question. Most of the questions are composed to elicit a "yes" or "no" answer although the system can also handle quantitative answers as well, as shown in FIG. 2.

Figure 3:
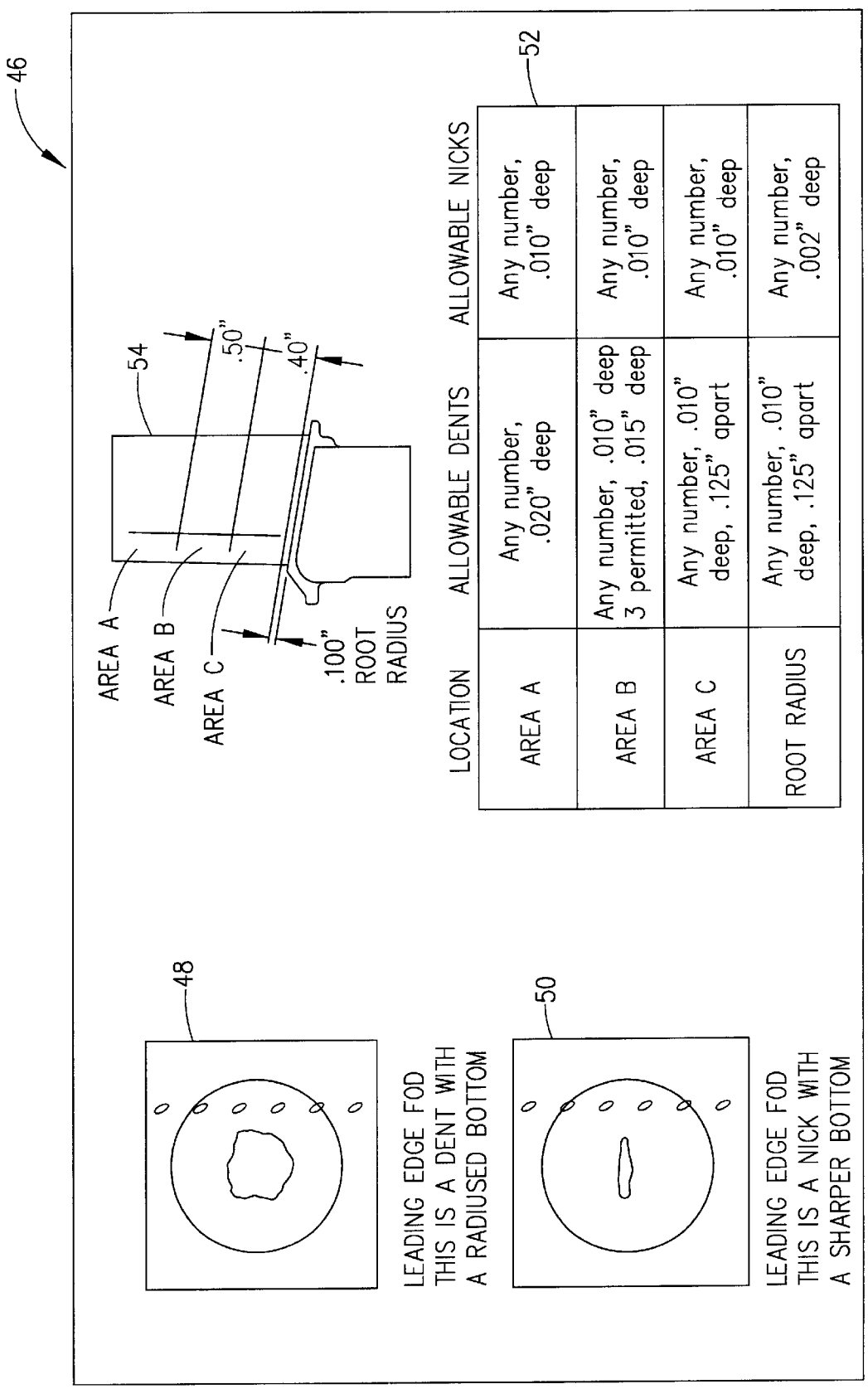
FIG. 3 graphically illustrates a detailed characteristic screen of the present invention.

The questions also contain hyperlinks to annotated digital images that assist the user in replying to the questions. In the illustrated example, the questions are generally directed to the blade's condition. For instance, the first question asks whether there is evidence of leading edge burning on the blade. If the user is unsure of what leading edge burning looks like, then he or she can click on the hyperlink for that question, and a detailed characteristic screen will be generated on the monitor of the client-user computer station 12. In one preferred embodiment, the detailed characteristic screen will present one or more digital images that show the user the pertinent features regarding the characteristic to which the question pertains. For instance, FIG. 3 shows the detailed characteristic screen 46 corresponding to the hyperlink for the sixth question "does the blade exceed the limits for Leading Edge Foreign Object Damage?" This particular detailed characteristic screen 46 shows two highly magnified digital photographic images 48 and 50 showing certain types of foreign object damage (FOD) on the leading edge of a blade. The first digital image 48 shows a dent, and the second digital image 50 shows a nick, wherein a nick is defined as having a sharper bottom than a dent. Each digital image 48 and 50 has a circle superimposed thereon and enclosing the FOD so as to draw the user's attention to this feature. The actual blade can be visually compared to the digital images 48 and 50 to assess the blade's condition. Thus, the user is better able to identify leading edge dents and nicks and to distinguish between them, and to do so in a manner consistent with other users throughout the world.

The detailed characteristic screen 46 also includes annotation in the form of a table 52 and corresponding drawing 54. The drawing 54 depicts a turbine blade and identifies various areas along the leading edge of the blade, which are used in characterizing the leading edge FOD. The table 52 sets forth the limits of acceptable denting and nicks in the various areas of the blade. For example if a blade had one or more dents in Area A greater than 0.020 inches in depth, then the user would answer the sixth question affirmatively.

As an alternative to digital images, it is possible to have the hyperlinks connect to a Web-based video such as streaming video. For instance, it is common in the repair of high pressure turbine blades to use a borescope to inspect the internal cooling passages of the blades. A video presentation of such a borescope inspection could be useful in the process optimization system of the present invention.

It is again emphasized that the present invention is not limited to the particular questions shown in FIG. 2, which are simply presented as one example to facilitate description of the inventive concept. Many different questions could be presented in the user prompt section 26, including questions pertaining to repair of another type of component or even questions pertaining to a different type of process such as a manufacturing process.

Turning again to FIG. 2, the functional button section 28 contains a number of buttons that the user can select to cause the system to produce a particular function or operation. The Inspect Blade button 56 is selected after the user has inputted all of the data and causes the selection software 18 to make the repair selection determination. The Next Blade button 58 is selected after the repair selection determination has been completed and the user is ready to begin entering data for another blade from the batch. The Save button 60 is selected after the entire batch has been completed; that is, after a repair selection determination has been made for each blade in the batch. Clicking the Save button 60 saves the batch results to a file that is stored on the database 20. The system can also be configured to automatically generate an e-mail message reporting the results of the batch inspection to the customer. The Reset button 62 clears the system for the next batch. The Report button 64 is used to bring up another screen on the client-user computer station's monitor that displays various raw data reports to be described in more detail below.

The results display section 30 includes a first output window 66 that displays the repair selection determination made by the selection software 18. The results display section 30 also includes a number of tally windows 68 that display a running tally of blades designated for each repair option.

Figure 4:
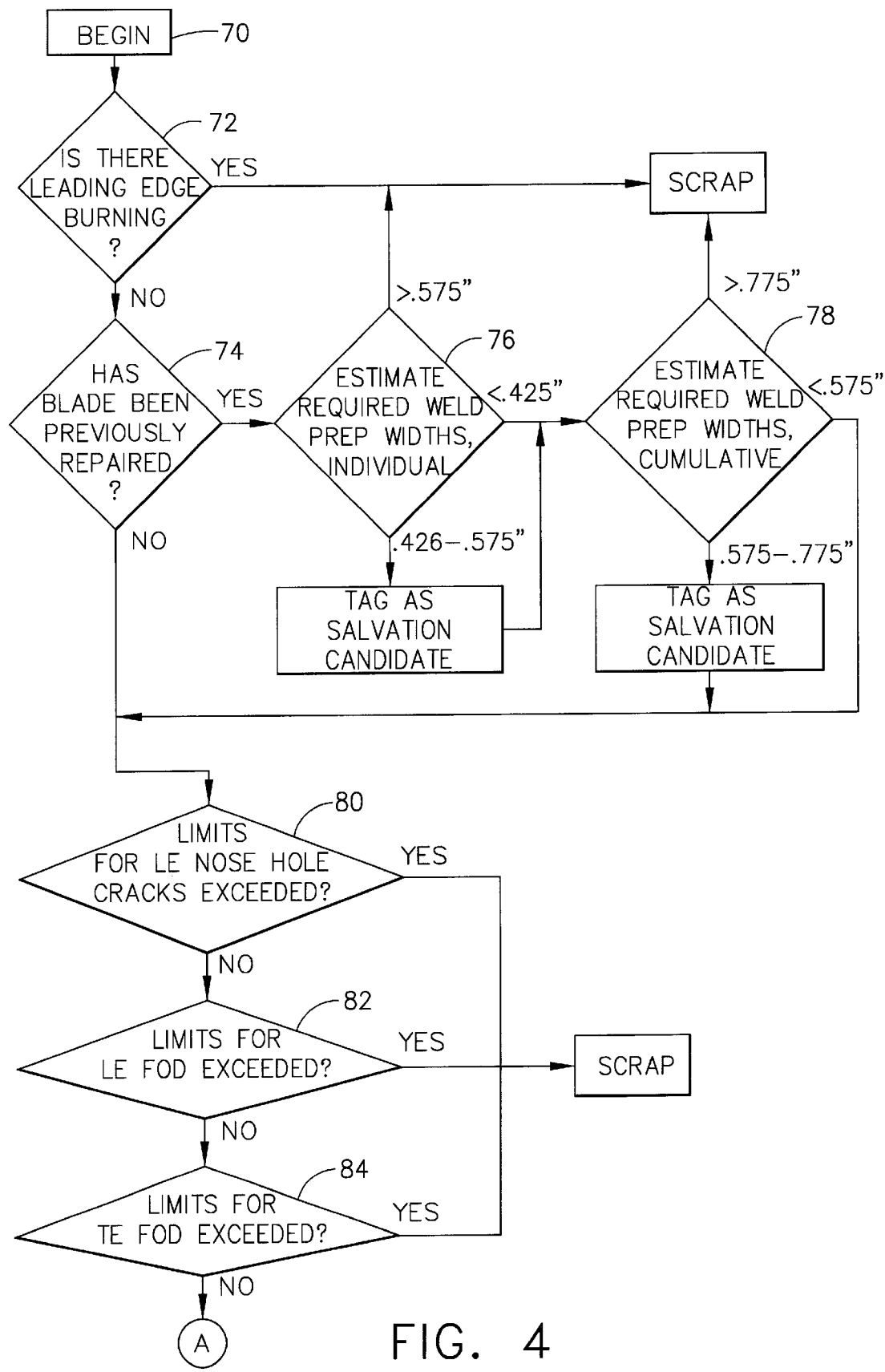
FIG. 4 is a flow chart that illustrates an initial portion of a process selection procedure of the present invention.
Figure 5:
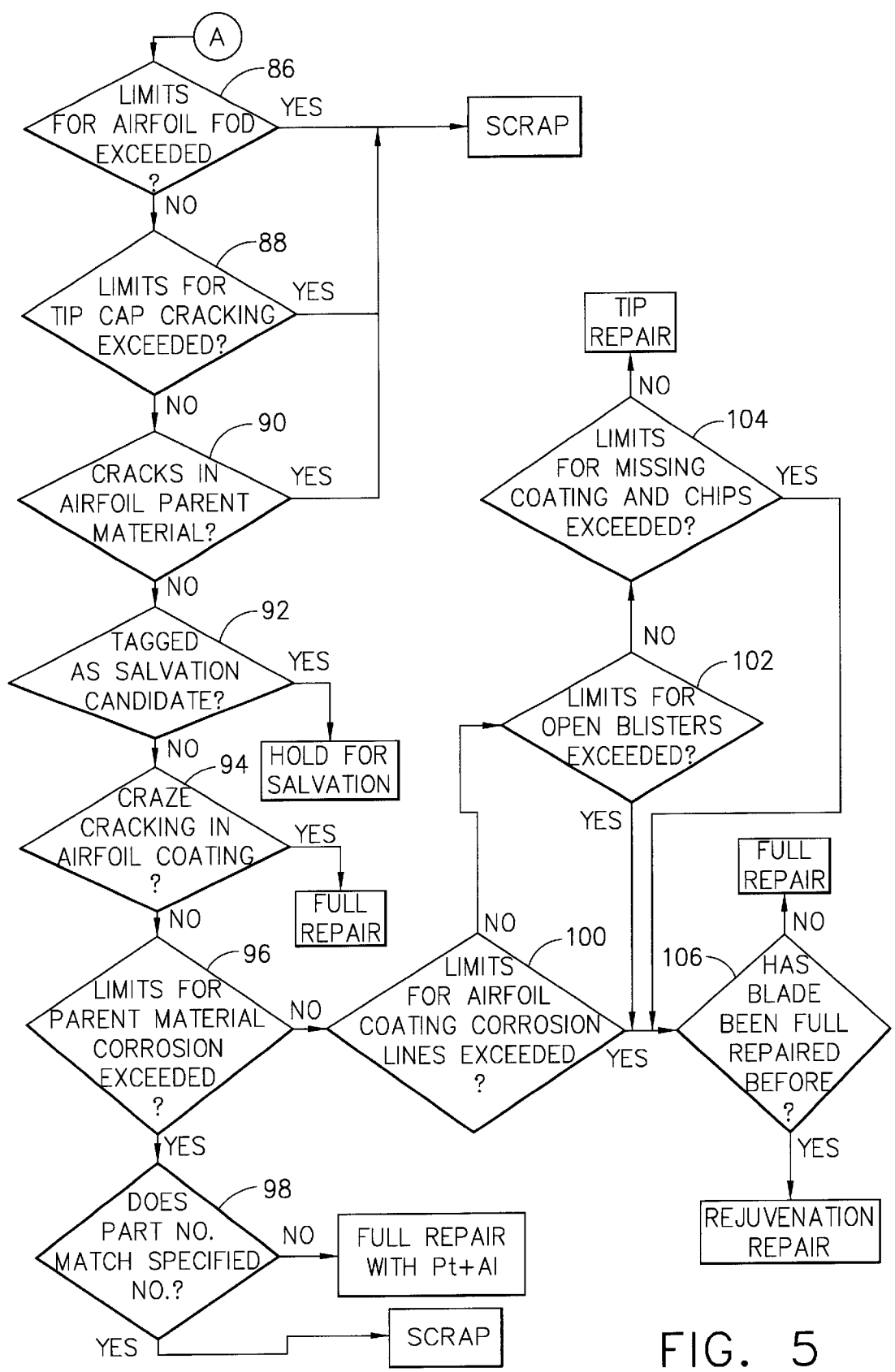
FIG. 5 is a flow chart that illustrates the remaining portion of the process selection procedure of FIG. 4.

A more detailed description of how the selection software 18 processes the inputted data to make a repair selection determination is presented in the combined block and flow diagrams of FIGS. 4 and 5. The repair selection determination process begins, as represent at block 70, when the user selects the Inspect Blade button 56. The selection software 18 first inquires at block 72 if the blade has leading edge burning. If leading edge burning is present, then the repair selection determination is made to scrap the blade and the selection process is completed. If leading edge burning is not present, then the process proceeds to the next inquiry at block 74. If the blade has been previously repaired the process next inquires what the estimated individual weld prep widths are at block 76. Here, if an estimated individual weld prep width exceeds a predetermined upper limit (example of 0.575 inches in FIG. 4), then the repair selection determination is made to scrap the blade and the process is completed. If all estimated individual weld prep widths are below a predetermined lower limit (example of 0.425 inches), then the process proceeds to the next decision at block 78. Blades for which all estimated individual weld prep widths fall between the two limits are deemed to be not repairable with existing repair techniques. However, it is believed that new repair technology will be developed which will enable repair of such blades. Thus, if all estimated individual weld prep widths fall between the two limits, the blade is tagged as a salvation candidate and the process then proceeds to the next decision at block 78.

At block 78, the process inquires what the estimated cumulative weld prep widths are. In this case, if the estimated cumulative weld prep widths exceed a predetermined upper limit (example of 0.775 inches), then the repair selection determination is made to scrap the blade and the process is completed. If the estimated cumulative weld prep widths fall below a predetermined lower limit (example of 0.575 inches), then the process proceeds to the next decision at block 80. If the estimated cumulative weld prep widths fall between the two limits, then the blade is tagged as a salvation candidate and the process then proceeds to the next decision at block 80.

The selection software 18 inquires at block 80 if the limits for leading edge nose hole cracks have been exceeded. If so, then the repair selection determination is made to scrap the blade and the process is completed. If not, then the process proceeds to block 82 where the inquiry is made as to whether the limits for leading edge foreign object damage have been exceeded. If so, then the repair selection determination is made to scrap the blade and the process is completed. If not, then the process proceeds to block 84 where the inquiry is made as to whether the limits for trailing edge foreign object damage have been exceeded. If so, then the repair selection determination is made to scrap the blade and the process is completed. If not, then the process proceeds to the next inquiry.

Referring now to FIG. 5, the rest of the repair selection determination process is shown. A negative answer in block 84 will take the process to block 86. Here if the limits for airfoil foreign object damage have been exceeded, then the repair selection determination is made to scrap the blade and the process is completed. If these limits have not been exceeded, then the process proceeds to block 88. Here, the inquiry is made as to whether the limits for tip cap cracking have been exceeded. If so, then the repair selection determination is made to scrap the blade and the process is completed. If not, then the process proceeds to block 90 where the inquiry is made as to whether cracks are present in the airfoil parent material. If so, then the repair selection determination is made to scrap the blade and the process is completed. If not, then the process proceeds to block 92.

Thus far, the repair selection process has been directed to determining whether blades are to be scrapped or not. The remainder of the process is devoted to selecting which repair is to be employed. At block 92, the inquiry is made as to whether the blade has been tagged as a salvation candidate. If it has, then the repair selection determination is made to hold the blade for salvation and the process is completed. If not, then the process proceeds to block 94. Here, the inquiry is made as to whether there is craze cracking in the airfoil coating. If so, then the repair selection determination is made to perform a full repair and the process is completed. If not, then the process proceeds to block 96 where the inquiry is made as to whether the limits for parent material corrosion have been exceeded. If so, then the process proceeds to block 98 where the blade's part number is checked against one or more specified part numbers. The specified part numbers identify parts for which a full repair using platinum aluminide is not an option. Thus, if the blade's part number matches a specified part number, then the repair selection determination is made to scrap the blade and the process is completed. If a specified part number is not matched, then the repair selection determination is made to perform a full repair with platinum aluminide and the process is completed.

If, at block 96, it is determined that the limits for parent material corrosion have not been exceeded, then the process proceeds to block 100. At this point, the inquiry is made as to whether the limits for airfoil coating corrosion lines have been exceeded. If these limits have not been exceeded, the process proceeds to block 102 where the inquiry is made as to whether the limits for open blisters in the airfoil coating have been exceeded. If these limits have not been exceeded, the process proceeds to block 104. At block 104 the inquiry is made as to whether the limits for missing coating or chips have been exceeded. If not, then the repair selection determination is made to perform a tip repair and the process is completed.

If any of the inquiries in blocks 100, 102 or 104 are answered in the affirmative, then the process proceeds to block 106. At block 106, the inquiry is made as to whether the blade has been full repaired before. If so, then the repair selection determination is made to perform a rejuvenation repair and the process is completed. If not, then the repair selection determination is made to perform a full repair and the process is completed.

In inspecting a batch of blades, a user accesses the process optimization system via one of the client-user computer stations 12. On the primary user interface screen 22, the user enters all relevant data for the batch of blades being inspected in the data input section 24. The user then proceeds to the user prompt section 26 and begins answering the questions by clicking the appropriate radio buttons. If the user is not sure of how to answer a question for a particular blade, then he or she can click on the hyperlink for that question, bringing up the corresponding detailed characteristic screen. The user can then visually compare the blade to the annotated digital images on detailed characteristic screen and determine how to answer the question.

Once all of the questions have been answered in the user prompt section 26, the user selects the Inspect Blade button 56 the selection software 18 makes the repair selection determination, which is displayed in the first output window 66. The user takes the appropriate action for that blade and then clicks the Next Blade button 58 to prep the system for the next blade in the batch. After all of the blades have been inspected in this fashion, the user selects the Save button 60. This causes the inspection results for the batch to be stored in the database 20. Also, the system can initiate an e-mail message to the customer reporting on the status of the inspection.

As mentioned above, selecting the Report button 64 on the primary user interface screen 22 will bring up another screen that shows the raw data stored in the database 20. These data reports will present information such as frequency of repairs broken down by customer and/or part number, repair and scrap rates broken down by repair facility, and so on. This information will be useful in tracking trends related to customer behavior, performance of prior repairs, and performance of various facilities. Analysis of these trends will provide insight into pricing decisions, marketing efforts, etc. Also, this information will provide an indication of the frequency and magnitude of specific service problems, thus aiding in the development of new repair technology.

The foregoing has described a system and method of using a computer network, particularly the Internet, to standardize processes across remote locations while assuring optimal use of available process technology. The system provides a thorough documentation of complex, subjective processes that is easily accessed around the world. As new process technologies or acceptability limits are developed, they can be effectively adopted overnight on a worldwide basis. The present invention also provides an accurate means for collecting a wide variety of data relevant to the process, leading to further process improvements.

While specific embodiments of the present invention have been described, it will be apparent to those skilled in the art that various modifications thereto can be made without departing from the spirit and scope of the invention as defined in the appended claims.

What is claimed is:

1. A method of optimizing a process performed at a plurality of geographically separated locations, said method comprising:

providing at least one central server computer system;

providing at least one client-user computer station at each location, each one of said client-user computer stations being capable of interfacing with said server computer system;

using any one of said client-user computer stations to input data relating to said process to said server computer system;

using said data to determine an optimal approach for performing said process; and displaying said optimal approach on said client-user computer station used to input said data.

2. The method of claim 1 wherein said step of using any one of said client-user computer stations to input data relating to said process to said server computer system includes:

generating a user interface screen on said client-user computer station used to input said data, said user interface screen including a plurality of questions relating to said process; and answering said questions by selecting appropriate buttons on said user interface screen.

3. The method of claim 2 further comprising the step of providing at least one of said questions with a hyperlink to another screen that includes detailed information pertinent to said at least one question.

4. A system for optimizing a process performed at a plurality of geographically separated locations, said system comprising:

at least one central server computer system;

at least one client-user computer station at each location, each one of said client-user computer stations being capable of interfacing with said server computer system;

means for inputting data relating to said process to said server computer system using any one of said client-user computer stations; and means for using said data to determine an optimal approach for performing said process.

5. The system of claim 4 wherein said means for inputting data include means for generating a user interface screen on said client-user computer station used to input said data, said user interface screen including a plurality of questions relating to said process.

6. The system of claim 5 wherein at least one of said questions has a hyperlink to another screen that includes detailed information pertinent to said at least one question.

7. The system of claim 5 wherein each one of said questions has a hyperlink to another screen that includes detailed information pertinent to the corresponding question.

8. A method of optimizing a process performed at a plurality of geographically separated locations, said method comprising:

providing a central server computer system capable of interfacing with a plurality client-user computer stations to receive data relating to said process;

using said data to determine an optimal approach for performing said process; and outputting said optimal approach at least one client-user computer station.

* * * * *